United States Patent Office 2,921,055
Patented Jan. 12, 1960

2,921,055

PROCESS FOR POLYMERIZATION OF VINYL COMPOUNDS IN THE PRESENCE OF A TERTIARY PHOSPHINE

Erwin Heisenberg, Erlenbach, Main, and Wolfgang Jurgeleit, Aschaffenburg, Germany, assignors to Vereinigte Glanzstoff-Fabriken AG, Wuppertal-Elberfeld, Germany No Drawing. Application December 27, 1956
Serial No. 630,738

Claims priority, application Germany December 31, 1955

9 Claims. (Cl. 260—88.7)

This invention, in general, relates to the polymerization of vinyl compounds.

This application is a continuation-in-part of the application of Wolfgang Jurgeleit, Serial No. 481,701, filed January 13, 1955. In the aforesaid application, it was found, surprisingly, that by the acting of tertiary phosphines on vinyl compounds that carry an electron-attracting substitutent (B. Eistert, Chemismus und Konstitution, Stuttgart 1948, pp. 132 and 206 ff.) it is possible to achieve a polymerization, which, with the careful exclusion of water, leads to valuable high-polymeric products. In this manner, all the compounds can be polymerized in a simple manner, which otherwise, as discussed above, are polymerized in a much more difficult process with basic catalysts by the anionic ionic-chain mechanism.

Polymerizations performed by tertiary phosphines in the absence of water run their course with remarkable smoothness and at good rates of speed. The temperature, furthermore, exercises only a slight influence on the speed of polymerization. Thus, for example, acrylonitrile at —70° C., with the addition of very small quantities of triethyl phosphine, can be converted in a short time into a high-polymeric product. The yield in polyacrylic nitrile is here practically quantitative. In place of acrylonitrile, many other vinyl compounds can be polymerized in an analogous manner. With vinyl compounds that carry a strong electron-attracting substituent, polymerization takes place especially quickly. With substituents with less electron-attracting effect the polymerization runs its course more slowly. As vinyl compounds with electron-attracting substituents in the sense of the process here described, the following, for example, may be employed: acrylonitrile, acrylic ester, methacrylic ester, acrolein, methyl vinyl ketone, and others.

In general, the tertiary phosphines are of the general formula:

wherein $R_1$, $R_2$, and $R_3$ may be lower alkyl or aryl, e.g., phenyl, and each of $R_1$, $R_2$, and $R_3$ may be the same or different groups. It has been proved that triethyl phosphine promotes the polymerization very efficiently, but other trialkyl phosphines as, for example, trimethyl phosphine, tripropyl phosphine, triisopropyl phosphine or tri-n-butyl phosphine are useable. Aromatic phosphines, e.g., triphenyl phosphine have, on the other hand, a reduced effect so that they are applicable only in certain cases. Mixed tertiary phosphines containing both alkyl groups and aryl groups also may be used as, for example, diethyl phenyl phosphine, dimethyl phenyl phosphine, etc.

For the performance of the polymerization by means of tertiary phosphines, it is essential that water be fully excluded. Even small amounts of water bring about an extreme deterioration of the qualities of the polymerides obtained. If, for example, to a polymerization bath of acrylonitrile and a small quantity of triethyl phosphine that was begun under a most thorough exclusion of water, a drop of water is added, then, instead of the high-molecular, solid, white polyacrylic nitrile expected, there results a viscous, greenish-brown resin. Also, it is preferable to run the reaction in an inert gas atmosphere, such as nitrogen, to exclude atmospheric moisture and avoid premature oxidation of the tertiary phosphine.

It is, accordingly, necessary to dry the participants in the reaction, especially the vinyl compounds, as, for example, the acrylonitrile, as thoroughly as possible, before the reaction. The usual desiccants, such as phosphoric pentoxide, sodium or sodium sulfate can be used. Despite the intensively executed drying with the drying agents mentioned, however, the polymerides produced showed a slight yellowish tinge.

It is an object of the present invention to provide a process for producing vinyl polymerides without discolorations.

Another object is to provide a process for polymerizing vinyl compounds in the presence of tertiary phosphines wherein the slight discoloring effect upon the polymerides is eliminated.

In accordance with this invention, it was found that in the polymerization of vinyl compounds which carry substituents attracting electrons, in the presence of tertiary phosphines, with the most thorough possible exclusion of water, very white polymerides are obtained, if the adequately predried starting products are treated with calcium chloride. The effect of the calcium chloride is, however, obviously not limited merely to the removal of the traces of water still present, but the calcium chloride, beyond this, ties up the components with a discoloring effect, probably originating in the tertiary phosphine. By the addition of calcium chloride to the carefully predried reaction mixture, the process for the polymerization of vinyl compounds by means of phosphine is considerably improved. Pure white polymerides are obtained.

The following examples will further illustrate the nature of this invention, but the invention is not limited to these examples.

Example I

Five hundred cc. of acrylonitrile were distilled into the reaction vessel over phosphoric pentoxide and mixed with 250 cc. of a solvent mixture of 2 parts toluene and 1 part petroleum ether. To this mixture approximately 20 g. of carefully dried calcium chloride were added. The polymerization bath was then cooled to —15° C. while being stirred, and quickly treated with a solution of 605 mg. of triethyl phosphine in 30 cc. toluene petroleum ether mixture. By intensive stirring the phosphine was finely distributed in the reaction mixture. The stirrer was turned off about 3 to 5 seconds after the addition of the phosphine. Immediate polymerization takes place to a pure white polymeride, which had a relative viscosity of 2.4 (K-value 67.7) in 1% dimethyl formamide solution.

Example II

One hundred cc. of acrylonitrile were treated with 17 g. of calcium chloride and cooled, while being stirred, to 0° C. The acrylonitrile was carefully dried beforehand. To the reaction mixture, with stirring, 80 mg. of triethyl phosphine dissolved in 30 cc. of a toluene-petroleum ether mixture were quickly added. Several seconds after the addition of the phosphine, the stirrer was turned off. Instant polymerization begins, which leads to a pure white polymeride. The polymeride has a relative viscosity of 1.38 (K-value 38) in 1% dimethyl formamide solution.

Example III

Four hundred cc. of carefully dried acrylonitrile were mixed with 800 cc. of the solvent mixture mentioned in Example I and with 20 g. of calcium chloride. The reaction mixture was cooled to −17° C. and, during intensive stirring, treated with a solution of 552 mg. triethyl phosphine in approximately 30 cc. of solvent mixture. The stirrer was turned off, as in the preceding examples, a few seconds after the addition of the phosphine. The polymerization begins at once and leads to a strong warming of the reaction mixture up to approximately 20° C., although the reaction vessel was surrounded by a cooling jacket with a temperature of −15 to −18° C. The reaction is completed in approximately 10 minutes. A pure white polymeride is obtained. The relative viscosity of the polymeride amounted to 1.5 (K-value 44) in 1% dimethyl formamide solution.

*Example IV*

One hundred cc. of acrylonitrile were dissolved in 300 cc. toluene and cooled to 0° C. The water content of the reaction mixture was below 0.001%. Then, about 5 grams of freshly dried calcium chloride were added, and thereupon a solution of 0.262 gram of dimethylphenyl phosphine in 60 cc. of toluene was added by drops in 15 minutes under strong stirring. After the addition, the agitator was stopped. The temperature rose to 36° C. in spite of outside cooling. After 1 hour there was separated a white polymeride, which in 1% dimethyl formamide solution had a relative viscosity of 1.59 (K-value 51).

The invention is hereby claimed as follows:

1. A process for polymerizing vinyl compounds which comprises agitating a small amount of a tertiary phosphine of the formula

wherein $R_1$, $R_2$ and $R_3$ are selected from the group consisting of lower alkyl and phenyl with a vinyl monomer having an electron attracting substituent, in conjugation with the ethylenically unsaturated group in the vinyl monomer, selected from the group consisting of $-C\equiv N$ and $>C=O$ under anhydrous conditions and in the presence of calcium chloride; and ceasing agitation of the mixture, whereupon polymerization of the vinyl monomer occurs.

2. A process for polymerizing vinyl compounds which comprises agitating a small amount of a tertiary phosphine of the formula

wherein $R_1$, $R_2$ and $R_3$ are selected from the group consisting of lower alkyl and phenyl with acrylonitrile under anhydrous conditions and in the presence of calcium chloride; and ceasing agitation of the mixture, whereupon polymerization of the acrylonitrile occurs.

3. A process for polymerizing vinyl compounds which comprises agitating a small amount of a tertiary phosphine, the organic substituents of which are selected from the class consisting of lower alkyl and phenyl, with a vinyl monomer having an electron attracting substituent, in conjugation with the ethylenically unsaturated group in the vinyl monomer, selected from the group consisting of $-C\equiv N$ and $>C=O$ under anhydrous conditions and in the presence of calcium chloride; and ceasing agitation of the mixture, whereupon polymerization of the vinyl monomer occurs.

4. A process for polymerizing vinyl compounds which comprises agitating a small amount of a tertiary phosphine, the organic substituents of which are selected from the class consisting of lower alkyl and phenyl, with acrylonitrile under anhydrous conditions and in the presence of calcium chloride; and ceasing agitation of the mixture, whereupon polymerization of the acrylonitrile occurs.

5. A process for production of polymers from vinyl compounds which comprises polymerizing under anhydrous conditions and at low temperatures a vinyl monomer having an electron attracting substituent, in conjugation with the ethylenically unsaturated group in the vinyl monomer, selected from the group consisting of $-C\equiv N$ and $>C=O$ in the presence of calcium chloride and a small amount of a tertiary phosphine of the formula

wherein $R_1$, $R_2$ and $R_3$ are selected from the group consisting of lower alkyl and phenyl.

6. The process of claim 5 wherein the vinyl monomer is acrylonitrile.

7. The process of claim 6 wherein $R_1$, $R_2$, and $R_3$ of the tertiary phosphine are each lower alkyl.

8. The process of claim 7 wherein the tertiary phosphine is triethyl phosphine.

9. The process of claim 5 wherein the tertiary phosphine is dimethylphenyl phosphine.

References Cited in the file of this patent

UNITED STATES PATENTS

| | | |
|---|---|---|
| 2,608,554 | Bullitt | Aug. 26, 1952 |
| 2,608,555 | Bullitt | Aug. 26, 1952 |
| 2,661,344 | Slocombe et al. | Dec. 1, 1953 |
| 2,675,372 | Coover et al. | Apr. 13, 1954 |